US010361922B2

United States Patent
Rajagopal et al.

(10) Patent No.: US 10,361,922 B2
(45) Date of Patent: Jul. 23, 2019

(54) SOFTWARE DEFINED NETWORK (SDN) PROXY CORRELATION INDEX (PCI) DATA-PLANE CONTROL

(71) Applicant: Sprint Communications Company L.P., Overland Park, KS (US)

(72) Inventors: Arun Rajagopal, Leawood, KS (US); Marouane Balmakhtar, Alexandria, VA (US); Carl Joseph Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 283 days.

(21) Appl. No.: 15/421,201

(22) Filed: Jan. 31, 2017

(65) Prior Publication Data
US 2018/0219744 A1    Aug. 2, 2018

(51) Int. Cl.
*G06F 15/173*    (2006.01)
*H04L 12/24*    (2006.01)
(Continued)

(52) U.S. Cl.
CPC .......... *H04L 41/12* (2013.01); *H04L 41/0806* (2013.01); *H04L 41/0893* (2013.01);
(Continued)

(58) Field of Classification Search
CPC . H04L 41/12; H04L 41/0806; H04L 41/0893; H04L 43/08; H04L 47/805; H04L 67/10; H04L 67/28; H04L 43/16
See application file for complete search history.

(56) References Cited

U.S. PATENT DOCUMENTS

2015/0124622 A1    5/2015    Kovvali et al.
2015/0163159 A1    6/2015    DeCusatis et al.
(Continued)

FOREIGN PATENT DOCUMENTS

WO    2014181335    11/2014
WO    2015119591    8/2015
(Continued)

OTHER PUBLICATIONS

Giuseppe Bianchi, et al.; "Open Packet Processor: a programmable architecture for wire speed platform-independent stateful in-network processing;" May 6, 2016; pp. 1-14; Cornell University Library; Ithaca, New York. (Year: 2016).*
(Continued)

*Primary Examiner* — Benjamin M Thieu

(57) ABSTRACT

A Software-Defined Network (SDN) distributes Proxy Correlation Index (PCI) control in an SDN data-plane. An SDN controller transfers SDN signaling that indicates a data-plane PCI configuration. An SDN data machine processes the SDN signaling and configures a PCI generator and a flow controller to implement the data-plane PCI configuration. The SDN data-plane machine processes user data flows per a Flow Description Table (FDT) and generates Key Performance Indicators (KPIs) for the user data flows. The PCI generator generates PCIs based on the KPIs and the data-plane PCI configuration. The flow controller updates the FDT based on the PCIs and the data-plane PCI configuration. The SDN data-plane machine processes the user data flows per the updated FDT.

18 Claims, 5 Drawing Sheets

(51) Int. Cl.
  *H04L 12/26* (2006.01)
  *H04L 29/08* (2006.01)
  *H04L 12/927* (2013.01)

(52) U.S. Cl.
  CPC ............ *H04L 43/08* (2013.01); *H04L 47/805* (2013.01); *H04L 67/10* (2013.01); *H04L 67/28* (2013.01); *H04L 43/16* (2013.01)

(56) References Cited

U.S. PATENT DOCUMENTS

| 2015/0163162 A1 | 6/2015 | DeCusatis et al. |
| 2016/0021135 A1 | 1/2016 | Chesla et al. |
| 2016/0205697 A1 | 7/2016 | Tan et al. |

FOREIGN PATENT DOCUMENTS

| WO | 2015121864 | 8/2015 |
| WO | 2016119822 | 8/2016 |
| WO | 2016139266 | 9/2016 |
| WO | 2016160007 | 10/2016 |

OTHER PUBLICATIONS

Giuseppe Bianchi, et al.; "Open Packet Processor: a programmable architecture for wire speed platform-independent stateful in-network processing;" May 6, 2016; pp. 1-14; Cornell University Library; Ithaca, New York.

Open Networking Foundation; "ONF SDN Evolution;" Sep. 8, 2016; pp. 1-47; Version 1.0; Open Networking Foundation; Palo Alto, California.

Giuseppe Bianchi; "Data Plane Programmability the next step in SDN;" Jul. 7, 2017; pp. 1-32; CNIT/University of Roma Tor Vergata; Rome, Italy.

Open Networking Foundation; "Framework for SDN: Scope and Requirements;" Jun. 2015; pp. 1-34; Version 1.0; Open Networking Foundation; Palo Alto, California.

* cited by examiner

SOFTWARE DEFINED NETWORK (SDN) PROXY CORRELATION INDEX (PCI) DATA-PLANE CONTROL

TECHNICAL BACKGROUND

Data communication systems exchange user data for user devices to provide various data communication services. The user devices may be phones, computers, media players, and the like. The data communication services might trust be media streaming, audio/video conferencing, data messaging, or internet access. Software-Defined Networks (SDNs) are a popular data communication system. SDNs are made of applications, controllers, and data-plane machines.

SDN applications interact with users and other systems to deliver control-plane management of communication networks and users in the SDN. The SDN applications exchange SDN signaling, such as open flow, with SDN controllers to implement the control-plane management. The SDN controllers exchange SDN signaling like open flow with SDN data switches. The SDN data switches process user data flows based on Flow Description Tables (FDTs). The FDTs correlate header data like destination address to flow operations like drop or forward.

The SDN data switches generate Key Performance Indicators (KPIs) like header data, packet counts, data latency, processor usage, memory capacity, and the like. The SDN switches transfer the KPIs to a Proxy Correlation Index (PCI) server. The PCI server processes the KPIs to generate PCIs that characterize SDN operations. The typical PCI is generated from multiple KPIs that are weighted and summed to generate an index score. Another PCI could be the average of other PCIs that are weighted and normalized. The PCI server transfers the PCIs to an SDN application and/or controller. The SDN application and/or controller processes the PCIs to generate FDT updates for the SDN data switches.

Unfortunately, the transfer of KPIs from the data-plane and the transfer of FDT into the data-pane burdens the SDN and delays intelligent feedback control.

Technical Overview

A Software-Defined Network (SDN) distributes Proxy Correlation Index (PCI) control in an SDN data-plane. An SDN controller transfers SDN signaling that indicates a data-plane PCI configuration. An SDN data machine processes the SDN signaling and configures a PCI generator and a flow controller to implement the data-plane PCI configuration. The SDN data-plane machine processes user data flows per a Flow Description Table (FDT) and generates Key Performance Indicators (KPIs) for the user data flows. The PCI generator generates PCIs based on the KPIs and the data-plane PCI configuration. The flow controller updates the FDT based on the PCIs and the data-plane PCI configuration. The SDN data-plane machine processes the user data flows per the updated FDT.

DETAILED DESCRIPTION

Figure 1:
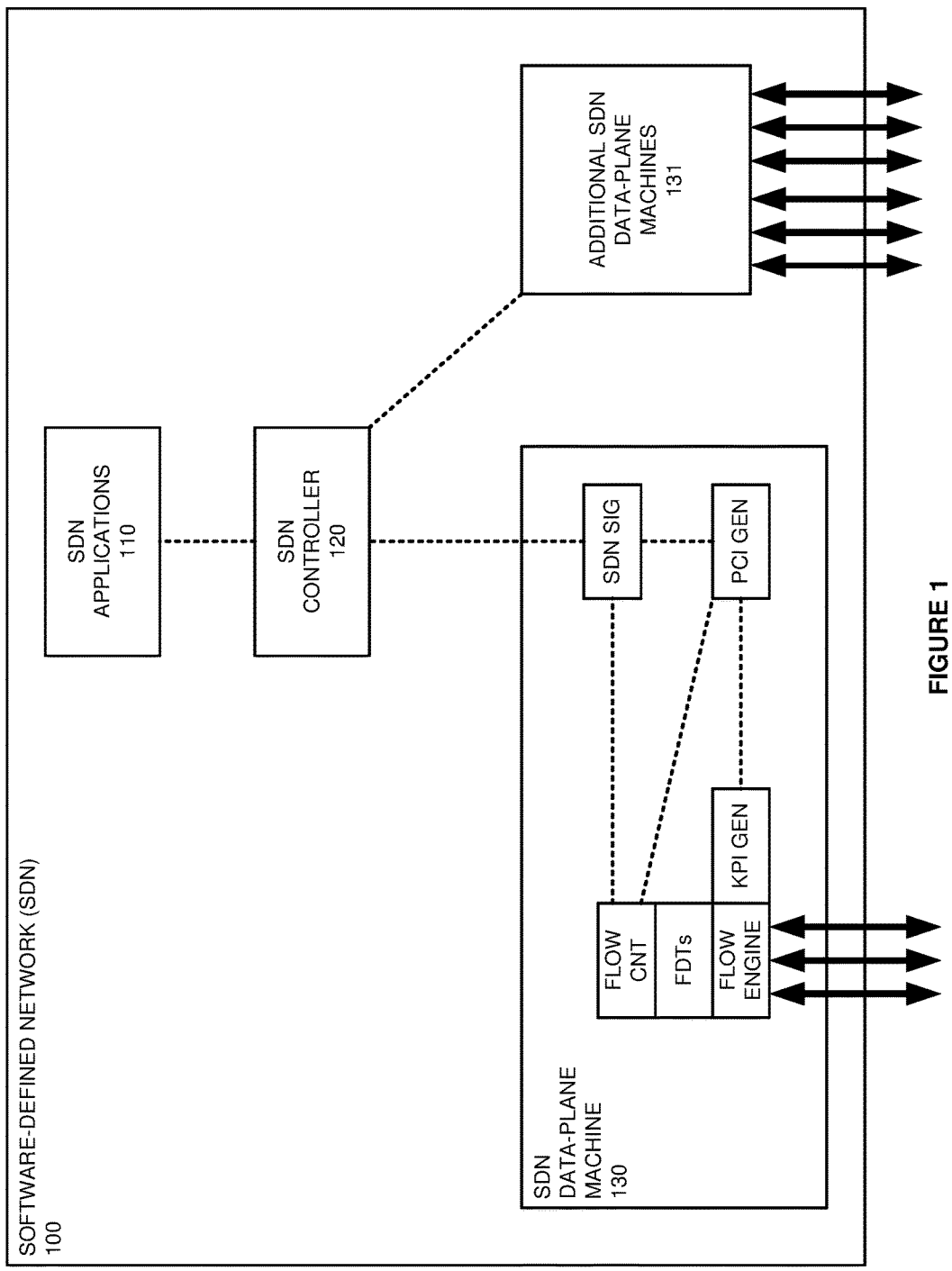
FIGS. 1-3 illustrate a Software-Defined Network (SDN) to distribute Proxy Correlation Index (PCI) control in an SDN data-plane.
Figure 2:
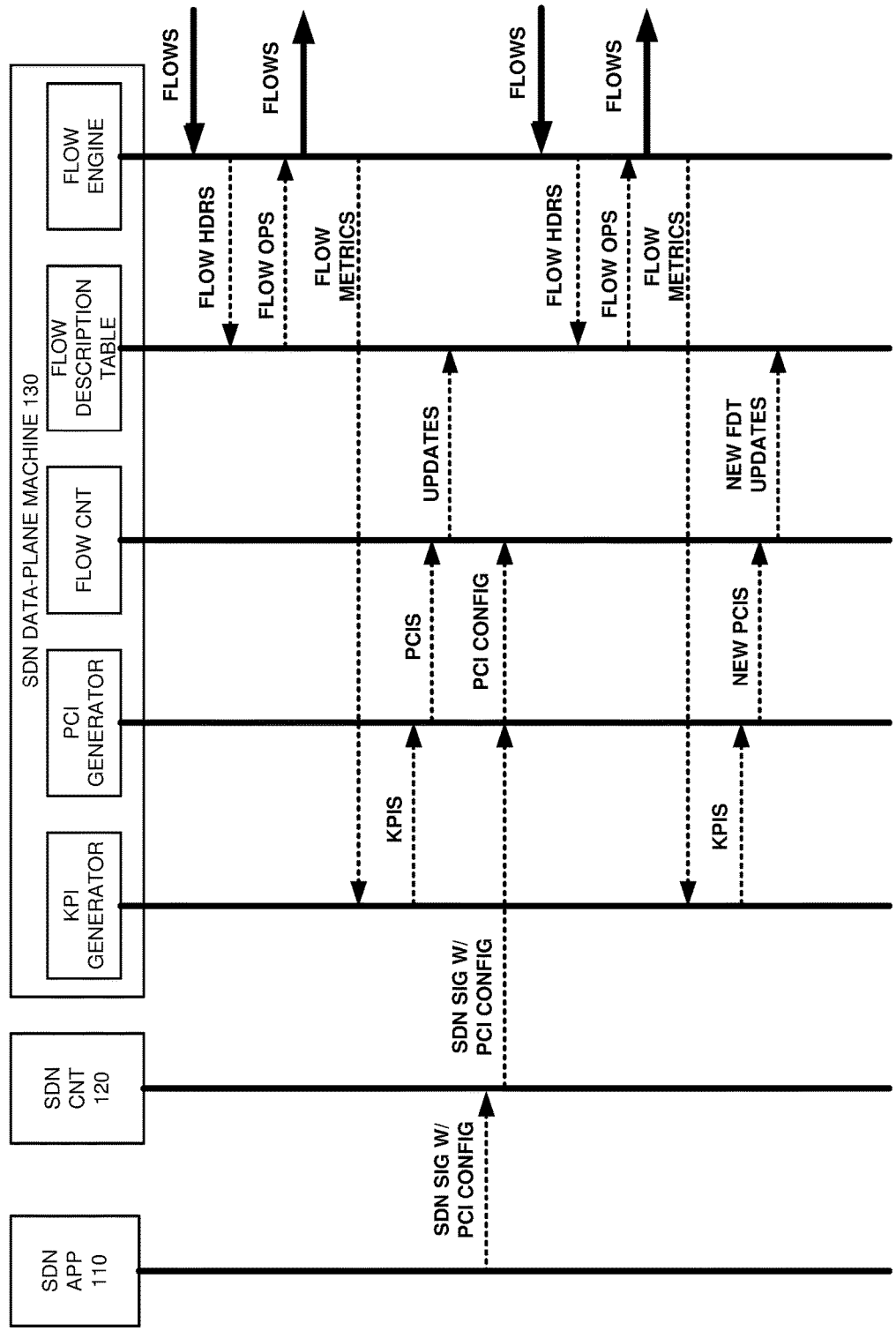
Figure 3:
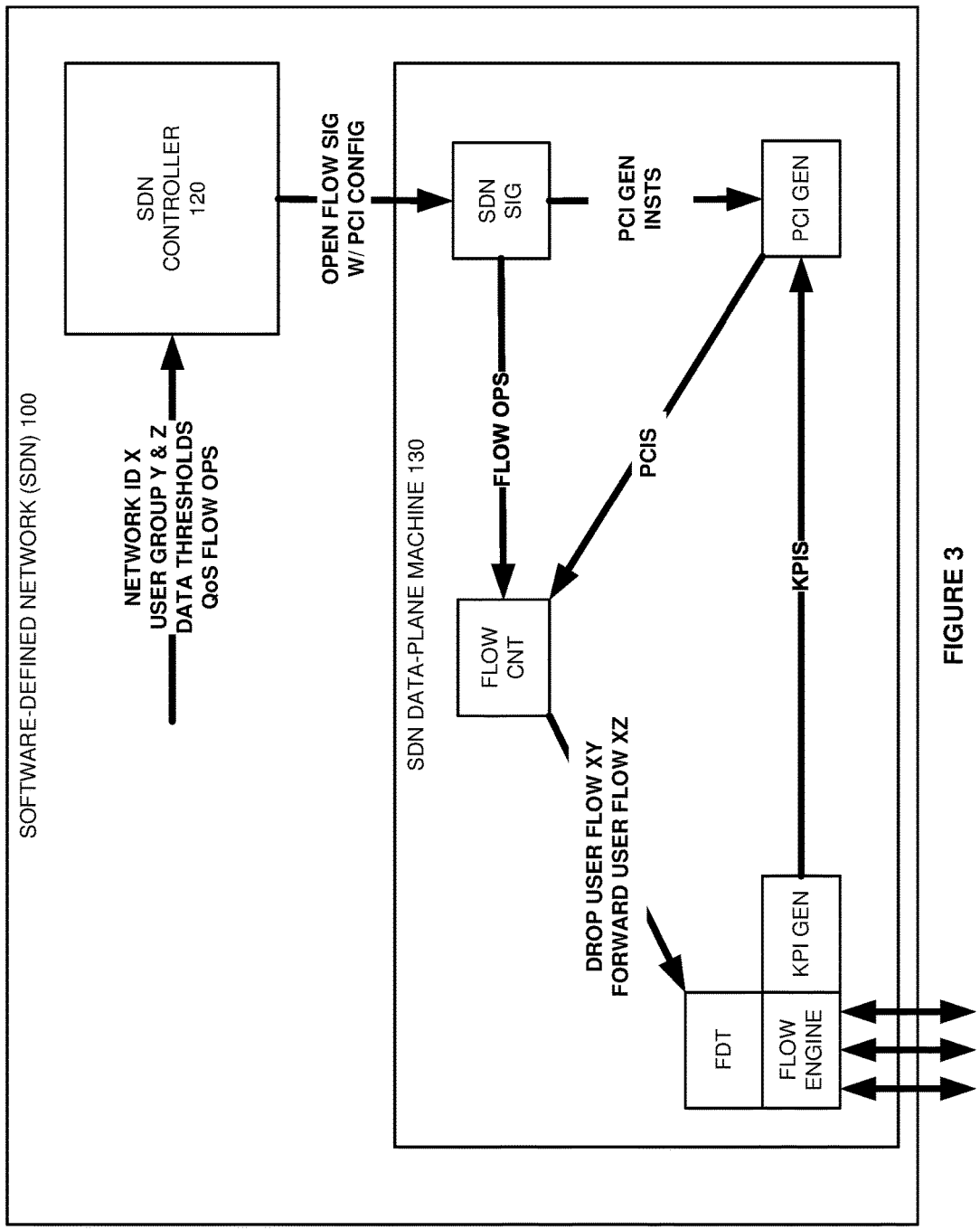

FIGS. 1-3 illustrate Software Defined Network (SDN) 100 to distribute Proxy Correlation Index (PCI) control in an SDN data-plane. SDN 100 exchanges user data for user devices like computers, phones, or some other intelligent machines. The user data exchange supports data services such as content streaming, media conferencing, machine communications, internet access, or some other computerized information service. SDN 100 is made of computer hardware like Central Processing Units (CPUs), Random Access Memory (RAM), persistent data storage, bus interfaces, and data transceivers. SDN 100 also has computer software like operating systems, applications, controllers, signaling interfaces, and flow engines.

Referring to FIG. 1, SDN 100 comprises SDN applications 110, SDN controller 120, and SDN data machines 130-131. SDN data machines 130-131 comprise computer hardware and software to process user data flows (depicted by solid lines with arrows) responsive to SDN signaling (depicted by dotted lines). SDN applications 110 and SDN controller 120 comprise computer hardware and software to generate, exchange, and process SDN signaling. The application and controller hardware/software might be a Network Function Virtualization (NFV) server system that executes SDN application Virtual Network Functions (VNFs) and SDN controller VNFs.

SDN data machines 130-131 implement data-plane PCI configurations. A PCI configuration indicates how to process Key Performance Indicators (KPIs) from SDN machines 130-131 to generate PCIs—including combination PCIs. KPIs include metrics like header data, packet counts, data latency, CPU usage, RAM capacity, and the like. PCIs characterize SDN operations and may be specific to a given communication network or user group. The typical PCI is generated from multiple KPIs that are weighted and summed to generate an index score. Another exemplary PCI could be the average of multiple PCIs that are weighted and normalized. Various PCI generation processes could be implemented. For example, a PCI configuration may indicate how to process packet header data to generate PCIs that indicate packet counts by traffic type for specific communication networks and user groups, where a traffic type indicates one or more layer 1-4 protocols and versions, such as Ethernet, internet, and real-time protocol to cite a few examples.

The PCI configuration also indicates how to process the PCIs to generate Flow Description Table (FDT) modifications. For example, a PCI configuration may indicate network and user data thresholds per traffic type that trigger FDT updates to protect quality-of-service for important user data flows while restricting service quality to less important data flows.

In operation, users interact with SDN applications 110 to develop data-plane PCI configurations. SDN applications 110 generate SDN signaling that indicates the PCI configurations. SDN applications 110 transfer this SDN signaling to SDN controller 120. SDN controller 120 receives and processes the SDN signaling from SDN applications 110 to generate SDN signaling for data machines 130-131 that indicates the PCI configurations. SDN controller 120 transfers this SDN signaling to SDN data machines 130-131. The SDN signaling might comprise open-flow signaling that indicates the data-plane PCI configurations.

In SDN data-plane machine 130, an SDN signaling (SIG) interface receives the SDN signaling and transfers the PCI configurations to a PCI generator (GEN) and to a flow controller (CNT). The PCI generator and flow controller are configured to implement the data-plane PCI configurations. For example, the PCI generator may modify its software to start generating a standard set of PCIs for a new communication network and some of its user groups. The flow controller may alter its software to modify FDTs to protect service quality for some of the new user groups.

A data flow engine in SDN data-plane machine 130 exchanges user data flows with various communication links. The data flow engine processes the user data flows per the FDTs and directs a KPI generator to transfer KPIs for the user data flows. The KPI generator transfers the KPIs to the PCI generator. The PCI generator generates PCIs based on the KPIs and the data-plane PCI configurations. The PCI generator transfers the PCIs to the flow controller. The flow controller modifies the FDTs based on the PCIs and the data-plane PCI configuration. The flow engine in SDN data-plane machine 130 now processes the user data flows per the modified FDTs.

Additional SDN data-plane machines 131 would be configured and operate in a similar manner. Thus, SDN data machines 131 receive SDN signaling that indicates PCI configurations. SDN data machines 131 process user data flows per FDTs. SDN data machines 131 generate PCIs for the user data flows based on KPIs and the data-plane PCI configurations. SDN data machines 131 modify FDTs based on the PCIs and the data-plane PCI configurations. SDN data machines 131 then process the user data flows per the modified FDTs.

Referring to FIG. 2, the flow engine in SDN data machine 130 receives user data flows and forwards flow header data to the Flow Description Table (FDT). The FDT translates the header data into flow operations. Header data includes origination/destination address and port, protocol, version, hop count, network identifier, and the like. The flow operations include forward, store, and drop. For example, an FDT may correlate a first internet address with port forwarding instructions and correlate a second internet address with drop instructions to maintain service quality for the first data flow. The flow engine transfer the user data flows per the FDT processing.

The flow engine transfers flow metrics to the KPI generator. The flow metrics indicate packet counts, time stamps, header data, and the like. The flow metrics may also indicate machine performance data like CPU usage and RAM capacity. The KPI generator processes the metrics to generate KPIs. The KPIs may indicate packet counts and data latency per network address and port for different types of user data packets. The KPIs may also indicate performance data like CPU usage and RAM capacity.

The KPI generator transfers the KPIs to the PCI generator. The PCI generator processes the KPIs to generate PCIs. For example, the PCI generator may process data latency KPIs and CPU usage KPIs to generate service quality PCIs for user groups in a communication network. The flow controller processes the PCIs to generate FDT updates. For example, the flow controller may modify an FDT to drop packets for a low-quality data flow when CPU usage exceeds a given threshold. The flow controller implements the updates in the FDTs.

Responsive to user inputs, one of SDN applications 110 transfers SDN signaling with a new PCI configuration to SDN controller 120. The new PCI configuration may comprise new PCIs and FDT operations for a user group in a communication network. SDN controller 120 transfers SDN signaling with the new PCI configuration to the PCI generator and flow controller in SDN data-plane machine 130.

The flow engine in SDN data-plane machine 130 receives user data flows and forwards the flow headers to the updated FDT. The updated FDT translates header data into flow operations, and the flow engine transfers the user data flows per the flow operations. The flow engine transfers flow metrics to the KPI generator. The KPI generator transfers KPIs to the PCI generator. The PCI generator processes the KPIs based on the new PCI configuration to generate new PCIs. The PCI generator transfers the new PCIs to the flow controller. The flow controller processes the new PCIs based on the new PCI configuration to generate new FDT updates. For example, the flow controller may modify an FDT to store packets for a new user group when data latency exceeds a given threshold for a given traffic type. The flow controller implements the new FDT updates in the FDT.

Referring to FIG. 3, an exemplary operation is described. SDN controller 120 receives information that indicates a new data-plane PCI configuration. The new data-plane PCI configuration indicates new PCIs and new flow operations for network X and user groups Y and Z. The new PCIs will indicate when minimum data rate thresholds are reached for user groups Y and Z. The new flow operations will drop flow XY and forward flow XZ to maintain service quality for flow XZ. SDN controller 120 transfers open flow signaling that indicates the PCI configuration to SDN data machine 130.

In SDN data-plane machine 130, the SDN signaling interface receives the SDN signaling and transfers the PCI generation instructions to the PCI generator and transfers the flow operations to the flow controller. The PCI generator starts generating PCIs that indicate when the minimum data rate thresholds are reached for user groups Y and Z in communication network X. The flow controller starts to modify FDTs to drop flow XY and forward flow XZ to maintain service quality for flow XZ.

The data flow engine in SDN data-plane machine 130 exchanges user data flows with communication links. The data flow engine processes the user data flows per the FDT and directs a KPI generator to transfer KPIs for the user data flows. The KPI generator transfers the KPIs to the PCI generator. The PCI generator generates PCIs based on the KPIs and the new data-plane PCI configuration. The PCI generator transfers old and new PCIs to the flow controller. The flow controller modifies the FDTs based on the PCIs and the new data-plane PCI configuration. The flow engine in SDN data-plane machine 130 now processes the user data flows per the modified FDTs.

Advantageously, SDN controller 120 and data machines 130-131 distribute PCI generation and consumption in the SDN data-plane. The generation and consumption of PCIs within SDN data machines mitigates the amount of PCI transfers from the SDN data-plane. The generation and consumption of PCIs within the SDN data machines also improves PCI triggering and FDT update times to improve the data communication service.

Figure 4:
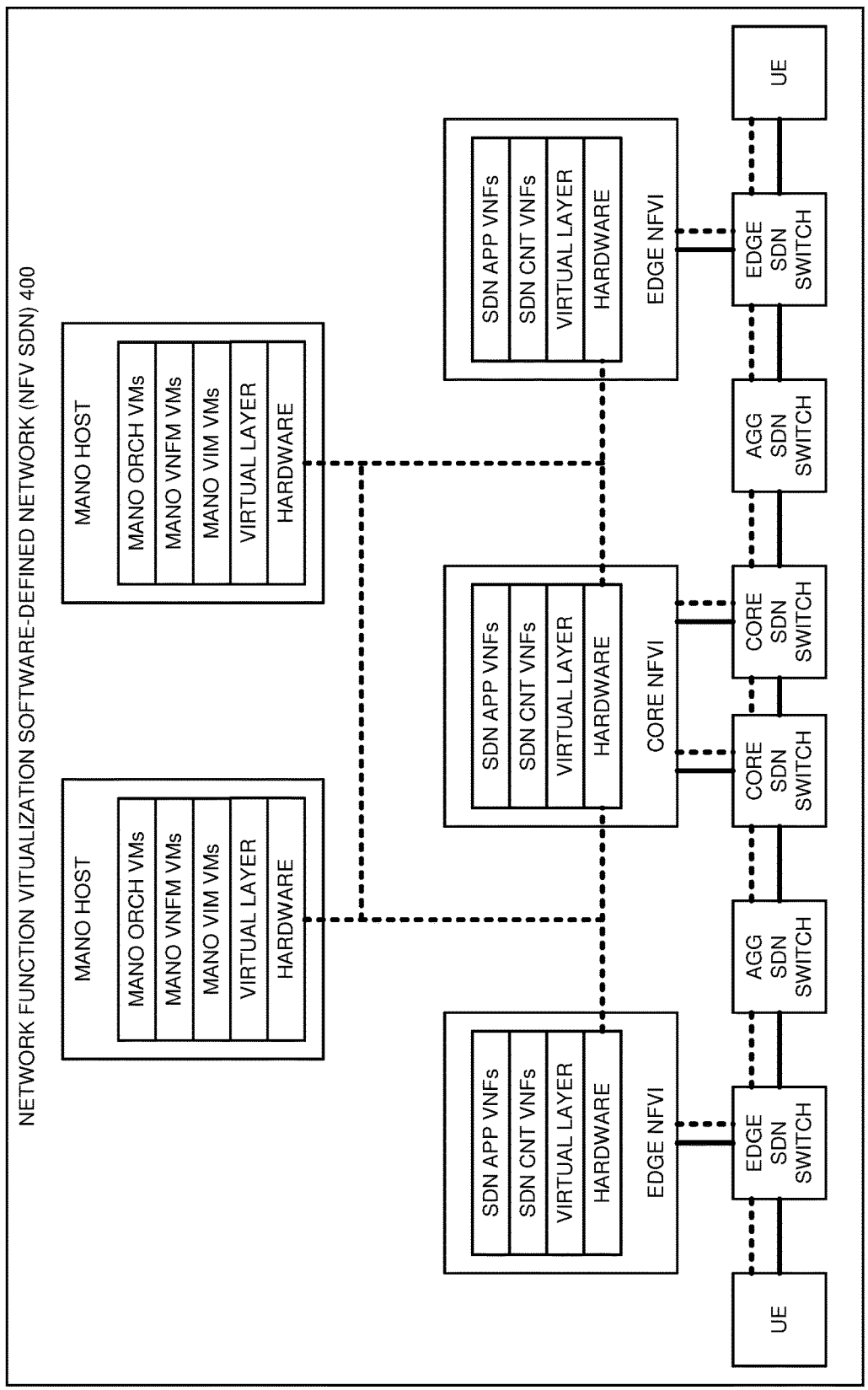
FIG. 4 illustrates a Network Function Virtualization (NFV) SDN to distribute PCI control in SDN data-plane switches.

FIG. 4 illustrate Network Function Virtualization (NFV) SDN 400 to distribute PCI control in SDN data-plane switches. NFV SDN 400 is an example of SDN 100, although SDN 100 may use alternative configurations and operations. NFV SDN 400 comprises: User Equipment (UE), edge SDN switches, aggregation (AGG) SDN switches, core SDN switches, edge NFV Infrastructures (NFVIs), a core NFVI, and MANO NFVI. The NFVIs comprise hardware such as server blades with CPU cores, data memories, transceivers, and the like. The edge SDN switches may include wireless base station VNFs that drive nearby wireless transceivers to exchange wireless data with the UEs.

The NFVIs execute virtual layer software to provide a virtualized processing environment to VNFs and virtual machines. The virtual layer comprises virtual hardware interfaces, hypervisors, operating systems, and NFVI controllers. Under the control of the MANO system, the virtual layers support various SDN VNFs. In the edge and core NFVIs, the virtual layers support SDN controller (CNT) VNFs and SDN application (APP) VNFs. In the MANO hosts, the virtual layer supports Virtual Machines (VMs) for MANO Virtual Infrastructure Managers (VIMs), VNF Managers (VNFMs), and Orchestrators (ORCHs).

Under the direction of the MANO ORCHs, the VIMs and VNFMs transfer networking data to the edge and core virtual layers to drive the execution of the SDN APP and CNT VNFs. To set-up a data session between the UEs, one of the UEs transfers a session request to an SDN application VNF. The SDN application VNF informs other SDN application VNFs to extend the session. The SDN VNFs transfer SDN controller API calls for the UE session to their associated SDN controller VNFs. The SDN controller VNFs transfer SDN data machine API calls to the SDN switches.

API responses flow back from the SDN switches to the SDN controller VNFs and to the SDN application VNFs. If needed, an SDN application VNF may direct an SDN controller VNF to drive an SDN data machine to deliver user data to an NFVI for heavier processing by NFV data-processing VNFs. For example, a given flow may be directed to a VNF to perform packet inspection, encryption, or the like.

The SDN switches process user data flows per FDTs. The SDN switches generate KPIs that indicate packet counts and data latency per network address and port for different types of user data packets. The KPIs also indicate switch performance like CPU usage and RAM capacity. The SDN switches process the KPIs to generate PCIs based on PCI configurations. The SDN switches process the PCIs to implement FDT updates based on PCI configurations. The SDN switches handle the user data flows per the updated FDTs.

SDN application VNFs transfer SDN signaling with the PCI configurations to SDN controller VNFs. SDN controller VNFs transfer SDN signaling with the PCI configurations to the SDN switches in the data-plane. The SDN switches receive and process user data flows per the updated FDTs.

Advantageously, the SDN controller VNFs and SDN switches distribute PCI generation and consumption in the SDN data-plane. The generation and consumption of PCIs within the SDN switches reduces the amount of PCI data transfers between the SDN control-plane and the SDN data-plane. The generation and consumption of PCIs within the SDN switches also improves PCI triggering and FDT update times to improve the data communication services.

Figure 5:
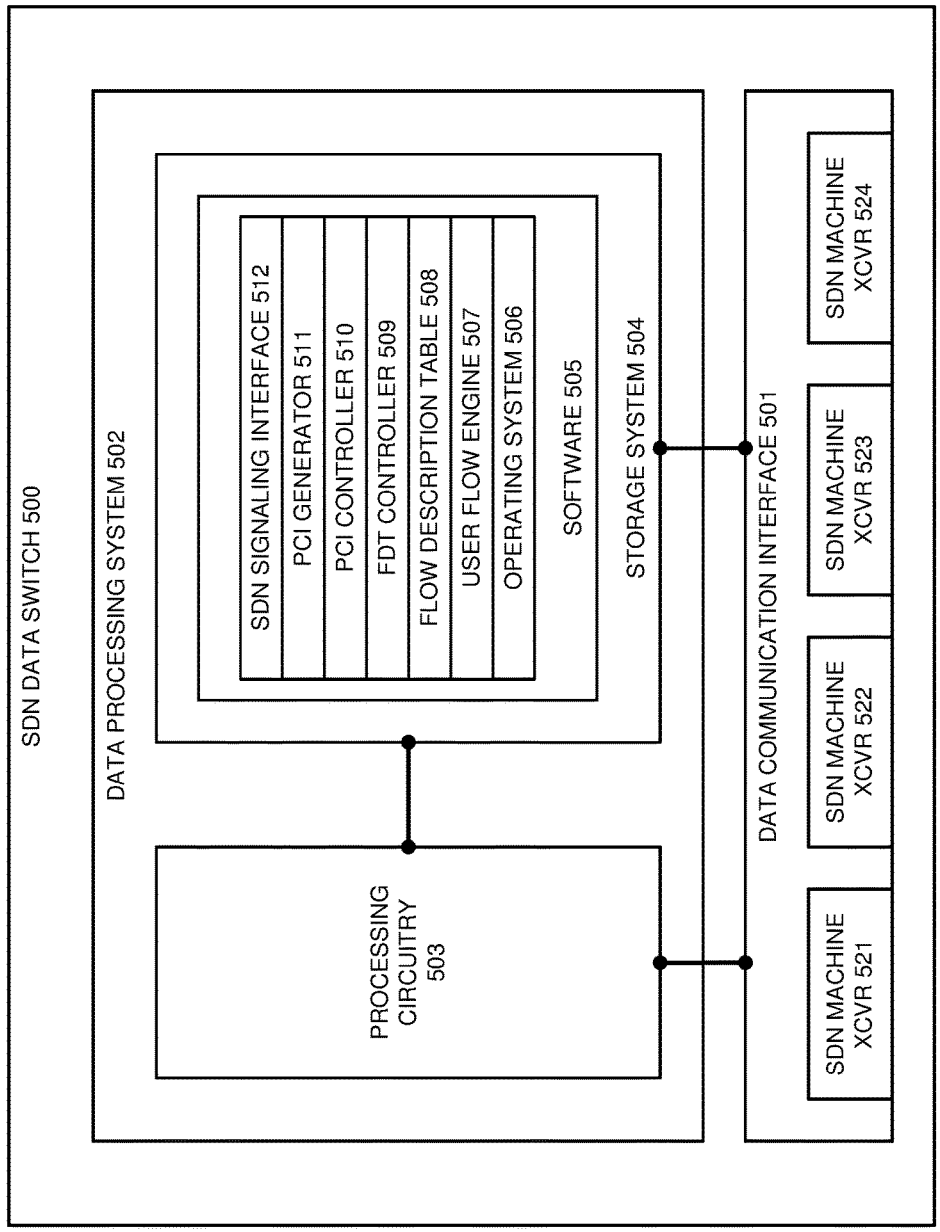
FIG. 5 illustrates an SDN data-plane switch that exerts PCI control.

FIG. 5 illustrates SDN data switch 500 that exerts PCI control. SDN data switch 500 is an example of SDN data machines 130-131 and the SDN switches of NFV SDN 400, although these data-plane systems may use alternative configurations and operations. SDN data switch 500 comprises data communication interface 501 and data processing system 502. Data communication interface 501 comprises SDN machine transceivers 521-524. Data processing system 502 comprises processing circuitry 503 and storage system 504. Storage system 504 stores software 505. Software 505 includes respective software modules 506-512.

SDN machine transceivers 521-524 comprise communication components, such as ports, bus interfaces, signal processors, memory, software, and the like. Processing circuitry 503 comprises server blades, circuit boards, bus interfaces, CPUs, integrated circuitry, and associated electronics. Storage system 504 comprises non-transitory, machine-readable, data storage media, such as flash drives, disc drives, memory circuitry, servers, and the like. Software 505 comprises machine-readable instructions that control the operation of processing circuitry 503 when executed.

SDN data switch 500 may be centralized or distributed. All or portions of software 506-512 may be externally stored on one or more storage media, such as circuitry, discs, and the like. Some conventional aspects of SDN data switch 500 are omitted for clarity, such as power supplies, enclosures, and the like. When executed by processing circuitry 503, software modules 506-512 direct circuitry 503 to perform the following operations.

Operating system 506 interfaces between software modules 507-512 and the data switch hardware (processing circuitry 503, data communication interface 510, RAM, storage). User flow engine 507 handles user data flows per File Description Table 508. File Description Table 508 correlates network addressing to data operations like forward, store, and drop. FDT controller 509 modifies File Description Table 508 per PCI controller 510. PCI controller 510 processes PCIs to determine the FDT modifications based on PCI configuration data. PCI generator 511 processes KPIs to generate the PCIs based on PCI configuration data. SDN signaling interface 512 processes SDN signaling like open flow to identify the PCI configuration data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Software-Defined Network (SDN) to distribute Proxy Correlation Index (PCI) control in an SDN data-plane, the method comprising:
an SDN controller generating and transferring SDN signaling that indicates a data-plane PCI configuration;
SDN data-plane machines receiving and processing the SDN signaling indicating the data-plane PCI configuration and responsively configuring a PCI generators and flow controllers to implement the data-plane PCI configuration;
the SDN data-plane machines receiving and processing user data flows per Flow Description Tables (FDTs) and responsively generating Key Performance Indicators (KPIs) for the user data flows;
in the SDN data-plane machines, the PCI generators generating PCIs based on the KPIs and the data-plane PCI configuration and the flow controller updating the FDTs based on the PCIs and the data-plane PCI configuration; and
the SDN data-plane machines receiving and processing the user data flows per the updated FDTs.

2. The method of claim 1 wherein the SDN controller generating and transferring the SDN signaling that indicates the data-plane PCI configuration comprises the SDN controller generating and transferring open-flow signaling that indicates the data-plane PCI configuration.

3. The method of claim 1 further comprising an SDN application generating and transferring SDN signaling indicating the PCI configuration to the SDN controller.

4. The method of claim 3 wherein the SDN application generating and transferring the SDN signaling indicating the PCI configuration comprises the SDN application generating and transferring open-flow signaling indicating the PCI configuration.

5. The method of claim 1 wherein the PCI generators generating the PCIs based on the KPIs and the data-plane PCI configuration comprises the PCI generators generating user traffic PCIs that indicate when a specified user group exceeds a data threshold for a specified traffic type.

6. The method of claim 1 wherein the PCI generators generating the PCIs based on the KPIs and the data-plane PCI configuration comprises the PCI generators generating network traffic PCIs that indicate when a specified communication network exceeds a data threshold for a specified traffic type.

7. The method of claim 1 wherein the flow controllers updating the FDTs based on the PCIs and the data-plane PCI configuration comprises the flow controllers updating the FDTs to maintain Quality-of-Service for at least one of the user data flows.

8. The method of claim 7 wherein the flow controllers updating the FDT to maintain the Quality-of-Service for the at least one of the user data flows comprises the flow controllers updating the FDTs to restrict other ones of the user data flows.

9. The method of claim 1 wherein the SDN data-plane machines receiving and processing the user data flows per the updated Flow Description Table FDTs comprises restricting at least one of the user data flows.

10. A Software-Defined Network (SDN) to distribute Proxy Correlation Index (PCI) control in an SDN data-plane comprising:
an SDN controller configured to generate and transfer SDN signaling that indicates a data-plane PCI configuration;
SDN data-plane machines configured to receive and process the SDN signaling indicating the data-plane PCI configuration and responsively configure PCI generators and flow controllers to implement the data-plane PCI configuration;
the SDN data-plane machines configured to receive and process user data flows per a Flow Description Tables (FDTs) and responsively generate Key Performance Indicators (KPIs) for the user data flows;
in the SDN data-plane machines, the PCI generators configured to generate PCIs based on the KPIs and the data-plane PCI configuration and the flow controllers configured to update the FDTs based on the PCIs and the data-plane PCI configuration; and
the SDN data-plane machines configured to receive and process the user data flows per the updated FDTs.

11. The SDN of claim 10 wherein the SDN controller is configured to generate and transfer open-flow signaling that indicates the data-plane PCI configuration.

12. The SDN of claim 10 further comprising an SDN application configured to generate and transfer SDN signaling indicating the PCI configuration to the SDN controller.

13. The SDN of claim 12 wherein the SDN application is configured to generate and transfer open-flow signaling indicating the PCI configuration.

14. The SDN of claim 10 wherein the PCI generators are configured to generate user traffic PCIs that indicate when a specified user group exceeds a data threshold for a specified traffic type.

15. The SDN of claim 10 wherein the PCI generators are configured to generate network traffic PCIs that indicate when a specified communication network exceeds a data threshold for a specified traffic type.

16. The SDN of claim 10 wherein the flow controllers are configured to update the FDTs to maintain Quality-of-Service for at least one of the user data flows.

17. The SDN of claim 16 wherein the flow controllers are configured to update the FDTs to restrict other ones of the user data flows.

18. The SDN of claim 10 wherein the SDN data-plane machines are configured to restrict at least one of the user data flows.

* * * * *